United States Patent Office 3,468,828
Patented Sept. 23, 1969

3,468,828
INCORPORATION OF A SOLID ADDITIVE INTO A POLYMER IN AN AQUEOUS SYSTEM
Lyle Eugene Perrins, St. Albans, and Fred Dawson and Henry George White, Blackley, Manchester, England, assignors to Imperial Chemical Industries Limited, London, England, a corporation of Great Britain
No Drawing. Filed June 27, 1966, Ser. No. 560,787
Claims priority, application Great Britain, June 30, 1965, 27,727/65; Sept. 22, 1965, 40,337/65
Int. Cl. C08f 1/92, 47/04
U.S. Cl. 260—23.7                                                 13 Claims

ABSTRACT OF THE DISCLOSURE

A process for the manufacture of polymeric composition consisting of polymerizing monomeric material consisting of at least one ethylenically unsaturated monomer in an aqueous medium in a polymerization vessel in the presence of a free radical yielding polymerization catalyst and adding a solid additive dispersed in an aqueous solution containing a water soluble salt of an aliphatic monocarboxylic acid having at least 6 carbon atoms to the aqueous medium before polymerization of the monomeric material is complete and, after adding the additive dispersion, reducing the pH of the aqueous medium to less than 7.0 before the polymeric material is separated from the aqueous medium and while unreacted monomeric material is present in the polymerization vessel.

---

This invention relates to the manufacture of polymer compositions and in particular to the manufacture of compositions comprising a synthetic thermoplastic polymeric material and one or more solid additives.

During the fabrication of synthetic thermoplastic polymeric materials into shaped articles it is normally desirable to incorporate various solid additives into the polymeric material to donate certain properties to the composition. Examples of such additives include heat and light stabilisers, lubricants, pigments, processing aids and fillers.

These additives are normally incorporated into the composition by fluxing the polymeric material on a mill at an elevated temperature and then introducing the additive. Alternatively the additive is mixed with the powdered polymeric material which is then milled or otherwise processed at an elevated temperature.

However, these processes involve mechanical working of the polymeric material at elevated temperatures. In order to get a very even dispersion of the additive in the polymeric material it is generally necessary to mix the additive with the polymeric material at an elevated temperature for a considerable length of time. Since many polymeric materials undergo thermal degradation reactions when subjected to elevated temperatures, it is desirable to limit the time that a polymeric material is subjected to elevated temperatures as much as possible. Therefore it is to be desired that mixing processes involving subjecting the polymeric material to elevated temperatures be kept to a minimum. Also, in the interests of economy, it is to be desired that separate compounding steps should be avoided.

We have found that many additives can be satisfactorily incorporated into certain polymeric materials during the manufacture of the polymeric materials themselves if a certain procedure is adopted.

The type of synthetic thermoplastic polymeric materials to which this invention is applicable are those polymers and copolymers made by polymerisation of ethylenically unsaturated monomers in an aqueous medium.

In this type of process, water, a polymerisation catalyst, the monomeric component and certain other materials such as dispersing agents or emulsifying agents are charged to a polymerisation vessel and polymerised therein. The polymeric material in the form of a slurry, dispersion or latex is then removed from the polymerisation vessel and the solid polymeric material is separated from the aqueous medium.

We have found that the additives may be successfully incorporated into the polymer if a dispersion of the additive in a suitable medium is added to the mixture in the polymerisation vessel or to the slurry, dispersion or latex before the polymer is separated from the aqueous medium.

It has been proposed to polymerise various monomers in the presence of additives such as lubricants and stabilisers and by this technique a separate compounding step may be avoided. While it is desirable to obtain a good, even, dispersion of additive in the polymer, this becomes particularly important where the additive is a pigment.

If the dry additive is added to the mixture in the vessel or to the slurry, dispersion or latex we have found that the additive is not as evenly dispersed in the resulting polymeric material as is desirable. Where the additive is, for example a stabiliser, while an even dispersion is generally desirable, it is by no means essential and so the addition of the dry additive can be tolerated in such cases.

Likewise addition of a paste comprising the additive mixed with water or an organic medium such as ethylene dichloride is also unsatisfactory since again the additive is not evenly dispersed in the polymeric material unless the additive is first coated with a suitable agent such as calcium stearate that will aid the dispersion of the additive in the monomer phase and then milled with the water or the organic medium to make the paste. The milling required to achieve a satisfactory dispersion is prolonged and so is not economically satisfactory.

Therefore according to the present invention we provide a process for the manufacture of polymeric compositions comprising polymerising one or more ethylenically unsaturated monomers in an aqueous medium in a polymerisation vessel in the presence of a free radical yielding polymerisation catalyst, characterised in that a dispersion of a solid additive in an aqueous solution of a water soluble salt of an aliphatic carboxylic acid containing 6 or more carbon atoms is added to the aqueous medium and the pH of the aqueous medium is reduced to less than 7.0 before the polymeric material is separated from the aqueous medium.

By the process of the invention, the retention of the additive in the final polymer is generally greater than with those prior art processes in which the additive is added before or during polymerisation.

Examples of ethylenically unsaturated monomers that may be used in the process of the present invention include the vinyl and vinylidene halides such as vinyl chloride and vinylidene chloride; vinyl esters of carboxylic acids such as vinyl acetate; chloroprene; esters of $\alpha,\beta$-ethylenically unsaturated acids with saturated alcohols such as methyl acrylate, methyl methacrylate, ethyl acrylate, and 2-ethyl hexyl acrylate, styrene and butadiene. Mixtures of monomers may be used to produce copolymers. Illustrative mixtures are butadiene and acrylonitrile; butadiene and styrene; butadiene and methyl methacrylate; butadiene, acrylonitrile and styrene; vinyl chloride and vinyl acetate, vinylidene chloride, alkyl acrylates and alkyl methacrylates such as methyl methacrylate and ethyl acrylate.

The invention is of particular interest in the manufacture of homopolymers of vinyl chloride or copolymers of vinyl chloride with minor amounts of comonomers, particularly copolymers of vinyl chloride with up to 20% by weight of comonomers.

As has been stated previously, some additives such as stabilisers and lubricants do not necessarily have to be as evenly dispersed as, for example, pigments. Hence, if desired, they can be added as dry powders to the aqueous medium, or added to the dried polymeric material and compounded in the normal manner. Alternatively they may be incorporated into the polymeric material by the process of this invention. Thus those additives that need to be dispersed evenly throughout the polymeric material should be added by the process of this invention while other additives may be added to the aqueous medium as dry powders, or compounded in the conventional manner, or added by the process of this invention.

Some compounds which are often used as additives of polymeric materials interfere with the course of the polymerization of the ethylenically unsaturated monomers. For example they may cause the reaction rate to decrease severely or to cease altogether. Examples of such compounds include some of the sulphur containing compounds used as stabilisers such as dibutyl tin S,S'bis (nonyl thioglycollate) and some phosphorus containing compounds such as tris(nonyl phenyl)phosphite.

In such cases where the additive interferes with the course of the polymerisation, whether or not the process of the invention is used to incorporate the additive, the additive should not be added to the aqueous medium until after the polymerisation reaction has proceeded to the required conversion. For example, in the case of vinyl chloride polymerisation, the additive may be injected into the polymerisation vessel just before the excess pressure due to unreacted monomer is released.

Alternatively, the additive may be added to the slurry of polyvinyl chloride after the excess pressure has been released.

The best results occur where the additive dispersion is added at the earliest possible stage in the production of the polymeric material. Thus, better dispersion of the additive throughout the polymeric material is obtained if the additive dispersion is added before venting excess monomer than if the additive dispersion is added after venting excess monomer. Likewise better dispersion of the additive throughout the polymeric material is obtained if the additive dispersion is added to the aqueous medium at the start of polymerisation than if the additive dispersion is added after the desired conversion has been achieved. Thus where the additive used does not interfere with the course of the polymerisation we prefer to add the additive dispersion at the start of polymerisation. Where the additive does interfere with the course of the polymerisation we prefer to add the additive dispersion to the aqueous medium after the desired conversion has been attained and before excess monomer is removed.

Additives that do not interfere with the course of polymerisation include many of the metallic salt stabilisers and lubricants such as the lead compounds including lead stearate, dibasic lead stearate, tribasic lead sulphate, basic lead carbonate, some tin compounds including dibutyl tin dilaurate, calcium salts such as calcium stearate. Other additives include cadmium stearate and cadmium laurate. Suitable pigments that may be used as additives include the inorganic compounds such as oxides, such as titanium dioxide; cadmium sulphides and selenides; chromates such as lead and zinc chromates; Prussian Blue; Brunswick Green; ultra-marines; and carbon blacks. Organic pigments such as copper phthalocyanine, halogenated copper phthalocyanine, diazo pigments, quinacridones, vat pigments such as indanthrone, flavanthrone and perylene derivatives may also be used.

The additive is incorporated in the form of a dispersion of the additive in an aqueous solution of a water soluble salt of an aliphatic carboxylic acid.

Suitable acids include the saturated acids such as capric, caprylic, caproic, lauric and stearic acids. Alternatively unsaturated acids such as oleic acid may be used. We prefer that the acid contains less than 22 carbon atoms and in particular contains from 8 to 20 carbon atoms and preferably 12 to 18 carbon atoms.

Suitable water soluble salts are the alkali metal and ammonium salts, in particular the sodium and potassium salts. Particularly suitable salts are sodium and potassium stearates.

If the acid itself or a water insoluble salt thereof, instead of a water soluble salt, is used to make the additive dispersion, a stable dispersion is not obtained unless the dispersion is very thoroughly milled and the additive is not evenly dispersed throughout or upon the polymer.

One theory for the mechanism of the present invention is that the water soluble salt of the acid acts somewhat as surface active agent to stabilise the aqueous dispersion of the additive. When the aqueous dispersion of the additive is added to an organic liquid such as a monomer and the mixture acidified, the water soluble salt of the acid is converted into the free acid which is deposited on to the surface of the additive particles. Since the acid is more soluble in the organic liquid than in water, the additive particles "flush" from the aqueous phase into the organic liquid phase. Where the additive dispersion is added to the aqueous medium after excess monomer is removed, the additive particles, instead of "flushing" from the aqueous phase to an organic liquid phase, are merely deposited on the polymer particles dispersed in the aqueous medium.

It appears that it is necessary that the acid used to make the dispersing agent should be weak so that the salt is readily decomposed when the pH of the aqueous medium is reduced. Thus other dispersing agents which are salts of strong acids, for example, sodium lauryl sulphate, sodium dodecyl benzene sulphonate, and others, cause little or no transfer of the additive to the organic liquid phase, on acidification.

Applicants do not wish, however, to be limited by the foregoing explanation of the mechanism.

If the water soluble salt of the acid is a salt of an acid containing less than 6 carbon atoms then, in general, the acid itself, (which applicants believe is formed on acidification of the aqueous medium), is too water soluble for satisfactory flushing to take place.

In order for the process to proceed satisfactorily it is necessary to ensure that the aqueous medium becomes acid, i.e. its pH must be reduced to less than 7.0, after the addition of the additive dispersion. While in some cases acidification may occur naturally during the course of polymerisation, it is generally necessary to add some acid to the aqueous medium after the addition of the aqueous dispersion.

Where the additive dispersion is added to the aqueous medium at the commencement of polymerisation, the aqueous medium should only be acidified after the introduction of the monomeric material so that an organic phase is present into which the additive particles may "flush."

Many additives such as pigments are available from the manufacturers as a wet cake or slurry. All that is necessary in these cases to make a suitable dispersion is to add an aqueous solution of the water soluble salt to the additive cake or slurry with stirring. However, other additives are dried by the manufacturers and are sold as powdered solids. These powders agglomerate on drying and it is desirable in order to obtain a good dispersion of additive in the resulting polymer to break down these agglomerates before incorporating the additive dispersion into the polymer. This may be achieved by milling the dry additive, using, for example, a ball mill, into fine particles and adding the particles to an aqueous solution of the water soluble salt. Alternatively the additive may be milled in the presence of the solution of the water soluble salt.

The amount of additive used will depend on the desired properties of the resulting composition. In general from 0.001 to 10% by weight, preferably 0.01 to 3% by weight, of additive is used, based on the weight of the monomeric component.

The amount of water soluble salt in the additive dispersion can be from 0.2 to 40% by weight, based on the weight of the additive, but we prefer to use from 1.0 to 30%, particularly 15 to 25% by weight, based on the weight of the additive. The solids content of additive dispersion varies with the additive it is desired to use and may contain from 10% to 60% by weight of the additives.

The polymerisation process may conveniently be conducted in the aqueous medium by either the suspension polymerisation technique or by emulsion polymerisation.

In the suspension polymerisation process, the monomer or mixture of monomers is dispersed in the aqueous medium in the form of droplets, normally with the assistance of a dispersing agent. The catalyst used is normally monomer soluble.

Suitable catalysts include the oil soluble peroxides such as benzoyl peroxide and lauroyl peroxide, peroxydicarbonates and azo compounds such as diazoaminobenzene, $\alpha,\alpha'$-azodiisobutyronitrile, $\alpha,\alpha'$-azodibutyric esters, as, for example, the corresponding methyl, ethyl or butyl esters, $\alpha,\alpha'$-azodi-$\alpha$-$\delta$-dimethyl valeronitrile and $\alpha,\alpha'$-azodicyclohexane carbonitrile. Mixtures of catalysts may also be used. The quantity of catalyst used will depend on the nature of the catalyst and polymerisation temperature but in general will be in the range 0.005 to 2% by weight of the polymerisable monomer or monomers.

Dispersing agents used for dispersing the monomer are generally protective colloids such as gelatin; methyl cellulose; the sodium salts of copolymers of unsaturated carboxylic acids and vinyl acetate or styrene; and completely or partially hydrolysed polyvinyl acetates. The quantity of dispersing agent is normally from 0.01 to 5%, preferably 0.15 to 2%, by weight, based on the weight of the monomer component.

In the emulsion polymerisation process, the monomer or mixture of monomers is dispersed in the aqueous medium in the form of an emulsion, normally with the assistance of an emulsifying agent. The catalyst used is normally water soluble.

Suitable polymerisation catalysts include the water soluble peroxy compounds such as hydrogen peroxide, the alkali metal and ammonium salts of acids containing peroxide groups such as persulphates, percarbonates and peracetates.

Mixtures of catalysts may also be used. The quantity of catalyst used will normally be similar to that used in suspension polymerisation.

Suitable emulsifying agents include the anionic emulsifying agents such as the sodium salts of sulphated and sulphonated hydrocarbons and fatty acids such as dioctyl sodium sulphosuccinate, sulphonated diesel oil and sodium lauryl sulphate; cationic emulsifying agents such as quaternary ammonium compounds such as stearamidopropyl dimethyl-$\beta$-hydroxy-ethyl ammonium nitrate, cetyl pyridinium chloride and cetyl trimethyl ammonium bromide; and non-ionic emulsifying agents such as polyalkylene oxides such as polyethylene oxide.

The quantities of emulsifying agent are those normally encountered in emulsion polymerisation, for example 0.05 to 5%, preferably 0.15 to 2%, by weight of the monomers.

Polymerisation is normally conducted at a temperature in the range 35 to 75° C., in particular 50 to 65° C.

The compositions made according to the process of the invention are particularly useful for making rod, tubing and other profiles by extrusion processes.

The invention is illustrated by the following examples in which all parts and percentages are expressed by weight except where otherwise indicated.

EXAMPLE 1

A stainless steel autoclave of capacity 6840 ml. was charged with 3580 ml. of distilled water, 1.9 gm. of partially hydrolysed polyvinyl acetate (88% hydrolysed), 4.8 gm. of $\alpha,\alpha'$-azodiisobutyronitrile and 23.5 gm. of a paste of a titanium dioxide pigment and water. The pigment paste had a solids content of 60.6%.

The autoclave was continuously stirred, evacuated to 4¼ inches of mercury residual air pressure and purged three times with nitrogen at 50 p.s.i.g. with evacuation between each purging. 1914 gm. of vinyl chloride was then charged to the autoclave which was then heated to 57° C. When the pressure had dropped 40 p.s.i. from the running pressure excess vinyl chloride was vented from the autoclave and the resulting polymer slurry was filtered, washed and dried. The conversion was 73%, and 66.7% of the titanium dioxide was retained by the polymer. The pH of the aqueous medium filtered from the polymer was measured and found to be 7.1. The dispersion of titanium dioxide in the polymer was uneven.

EXAMPLE 2

Example 1 was repeated using 88.8 gm. of a dispersion of titanium dioxide in an aqueous solution of potassium stearate in place of the titanium dioxide paste. Also 50 ml. of N-hydrochloric acid was washed into the autoclave with 50 ml. of distilled water after the vinyl chloride was charged.

The dispersion of titanium dioxide was made by stirring up a 200 gm. of a wet cake of titanium dioxide pigment of solids content 60.6% with 200 ml. of distilled wtaer, 15 ml. of N-sodium hydroxide and 300 ml. of a 10% aqueous solution of potassium stearate.

The conversion of monomer to polymer was 79.9% and the retention of the titanium dioxide was nearly 100%. The pH of the aqueous medium filtered from the polymer was 2.6. The dispersion of titanium dioxide in the polymer was even.

EXAMPLE 3

Example 1 was repeated using 40.9 gm. of a dispersion of titanium dioxide in an aqueous solution of potassium oleate in place of the titanium dioxide paste. Also 200 ml. of N/10 hydrochloric acid was washed into the autoclave with 50 ml. of distilled water after the vinyl chloride was charged.

The dispersion of titanium dioxide was made by stirring 200 gm. of a wet cake of a titanium dioxide pigment of solids content 60.6% with 120 ml. of a 10% aqueous solution of potassium oleate.

The monomer to polymer conversion was 92% and the titanium dioxide retention was about 92%. The pH of the aqueous medium filtered from the polymer was 3.55. The titanium dioxide was evenly dispersed throughout the polymer.

EXAMPLE 4

Example 1 was repeated using 40.9 gm. of a dispersion of titanium dioxide in an aqueous solution of sodium benzoate in place of the titanium dioxide paste. 200 ml. of N/10 hydrochloric acid were washed into the autoclave with 50 ml. of distilled water after the vinyl chloride was charged.

The dispersion of titanium dioxide was made by stirring 250 gm. of a wet cake of a titanium dioxide pigment of solids content 60.6% with 150 ml. of a 10% aqeous solution of sodium benzoate.

The monomer to polymer conversion was 79.4%, but the titanium dioxide retention was only 29.3%. The pH of the filtrate was 4.1. The titanium dioxide was not uniformly dispersed in the polymer.

EXAMPLE 5

Example 1 was repeated using 62.5 gm. of a dispersion of titanium dioxide in an aqueous solution of sodium caproate in place of the titanium dioxide paste. 200 ml.

of N/10 hydrochloric acid were washed into the autoclave with 50 ml. of distilled water after the vinyl chloride was charged.

The dispersion of titanium dioxide was made by stirring 200 gm. of a wet cake of titanium dioxide of solids content 60.6% with 300 ml. of a 10% aqueous solution of sodium caproate.

The monomer to polymer conversion was 76% and the titanium dioxide retention was 82%. The pH of the filtrate was 3.9. The titanium dioxide was uniformly distributed through the polymer.

EXAMPLE 6

Example 5 was repeated using sodium valerate in place of sodium caproate. The monomer to polymer conversion was 79% but the titanium dioxide retention was only 25.3%. The pH of the filtrate was 4.2. The distribution of titanium dioxide was poor and uneven.

EXAMPLE 7

Example 1 was repeated using 66.4 gm. of a dispersion of titanium dioxide in an aqueous solution of sodium caprylate in place of the titanium dioxide paste. 200 ml. of N/10 hydrochloric acid were washed into the autoclave with 50 ml. of distilled water after the vinyl chloride was charged.

The dispersion of titanium dioxide was made by ball milling 200 gm. of a titanium dioxide pigment powder with 140 ml. of a 10% aqueous solution of sodium caprylate.

The monomer to polymer conversion was 77.3% and the titanium dioxide retention was 85%. The pH of the filtrate was 4.0. The titanium dioxide was evenly distributed throughout the polymer.

EXAMPLE 8

Example 1 was repeated using 55.2 gm. of a dispersion of titanium dioxide in an aqueous solution of sodium laurate in place of the titanium dioxide paste. 200 ml. of N/10 hydrochloric acid were washed into the autoclave with 50 ml. of distilled water after the vinyl chloride was charged.

The dispersion of titanium dioxide was made by stirring 200 gm. of a wet cake of a titanium dioxide pigment of solids content 60.6% with 100 ml. of distilled water and 120 ml. of a 10% aqueous solution of sodium laurate.

The monomer to polymer conversion was 80% and the titanium dioxide retention was 89%. The pH of the filtrate was 4.2. The titanium dioxide was uniformly distributed throughout the polymer.

EXAMPLE 9

Example 1 was repeated using 63.8 gm. of a dispersion of titanium dioxide in an aqueous solution of a sodium rosinate in place of the titanium dioxide paste. 200 ml. of N/10 hydrochloric acid were washed into the autoclave with 50 ml. of distilled water after the vinyl chloride was charged.

The dispersion of titanium dioxide was made by stirring 200 gm. of a wet cake of a titanium dioxide pigment of solids content 60.6% with 300 ml. of a 10% aqueous solution of a sodium rosinate (a salt of an aromatic carboxylic acid—Dresinate 214).

The monomer to polymer conversion was 73.1% but the titanium dioxide retention was 23.3%. The pH of the filtrate was 4.0. The dispersion of titanium dioxide in the polymer was uneven.

EXAMPLE 10

Example 1 was repeated using 63.8 gm. of a dispersion of titanium dioxide in an aqueous solution of cetyl pyridinium chloride in place of the titanium dioxide paste. Since cetyl pyridinium chloride is stable to acid and hence would not decompose on acidification, it was expected that making the aqueous medium alkaline would enable the pigment dispersion to "flush" into the monomer phase. Therefore 200 ml. of N/10 sodium hydroxide were washed into the autoclave with 50 ml. of distilled water after the vinyl chloride was charged.

The dispersion of titanium dioxide was made by ball milling 200 gm. of a titanium dioxide pigment powder with 100 ml. of water and 200 ml. of a 10% aqueous solution of cetyl pyridinium chloride.

The monomer to polymer conversion was 67% but the retention of titanium dioxide was only 22%. The pH of the filtrate was 9.1. The distribution of titanium dioxide in the polymer was uneven. Thus surprising little or no "flushing" of the pigment occurred.

EXAMPLE 11

Example 9 was repeated using sodium lauryl sulphate in place of sodium rosinate. The monomer to polymer conversion was 72% but the retention of titanium dioxide was only 23.6%. The pH of the filtrate was 3.8. The distribution of titanium dioxide in the polymer was uneven. Similar results were also obtained using (a) sodium dodecyl benzene sulphonate and (b) the sodium salt of sulphonated methyl oleate in place of sodium lauryl sulphate.

These examples show that while salts of aliphatic carboxylic acids with 6 or more carbon atoms give good results, the $C_5$ aliphatic acid salts, salts of aromatic acids and other surface active agents are unsatisfactory.

EXAMPLE 12

A pigment dispersion was made up by ball milling 778 gm. of a stearic acid coated titanium dioxide pigment powder with 28 gm. of a carbon black, 135 gm. of an ultramarine blue pigment, 941 ml. of distilled water and 94 gm. of potassium stearate.

2670 ml. of distilled water was charged to a stirred stainless steel autoclave with 6.5 gm. of $\alpha,\alpha'$-azodiisobutyronitrile and 2.6 gm. of a 52% hydrolyzed polyvinyl acetate. The autoclave was evacuated to 4¼ inches of mercury residual air pressure and purged three times with nitrogen at 50 p.s.i.g., evacuating the autoclave between each purging. 1300 gm. of vinyl chloride was then added and the autoclave heated to 57° C. 14.8 gm. of the pigment dispersion was added when the pressure had dropped 20 p.s.i. from the running pressure. 5 minutes later 23 ml. of N/10 hydrochloric acid was then added and the mixture stirred for a further hour. Excess monomer was then vented to atmospheric pressure and the polymer was then filtered from the aqueous medium, washed and dried.

The pH of the filtrate was 6.8. The polymer was compounded with lead stabilisers and a lubricant, calcium stearate and extruded at a die temperature of 205° C. on a small screw extruder. The extrudate was a grey brown colour having a carbon black well dispersed. There were occasional white specks in the extrudate.

EXAMPLE 13

Example 12 was repeated but 50 ml. of N/10 sodium hydroxide was added instead of the hydrochloric acid. The pH of the filtrate was 9.1 and was coloured by the pigment. The extrudate was pale grey brown colour.

EXAMPLE 14

Example 12 was repeated but the pigment dispersion and acid were added after the pressure in the autoclave had dropped 55 p.s.i. below the running pressure and excess monomer had been vented from the autoclave. The filtrate had a pH of 5.4 and was slightly coloured by the pigment. The extrudate was grey brown in colour, lighter than that of Example 12 but darker than that of Example 13.

EXAMPLE 15

The pigment dispersion used was the same as that used in Example 12.

A stirred stainless steel autoclave of capacity 6840 ml. was charged with 3690 ml. of distilled water, 9.23 gm. of hydroxy ethyl cellulose, 1.2 gm. of diisopropylperoxidicarbonate, 23.3 gm. of a paste of 6 parts of tribasic lead sulphate in 1 part of dioctyl phthalate, 6.64 gm. of calcium stearate, 1992 gm. of dibasic lead stearate and 88.8 gm. of stearic acid. 21.0 gm. of the pigment dispersion used in Example 12 was then added. The autoclave was evacuated and purged as in Example 12 and 1845 gm. of vinyl chloride was then added, followed by 21 ml. of N hydrochloric acid. The autoclave was heated to 57° C. Excess monomer was vented off when the pressure in the autoclave had droped 55 p.s.i. from the running pressure. The polymer was filtered, washed and dried. The pH of the filtrate was 6.2.

The polymer was then extruded at a die temperature of 205° C. on a small screw extruder and gave a dark uniform grey extrudate.

EXAMPLE 16

Example 15 was repeated but adding the pigment dispersion and acid when the pressure in the autoclave had dropped 40 p.s.i. from the running pressure. The pH of the filtrate was 5.5. The extrudate was a uniform grey but was slightly lighter than that of Example 15.

EXAMPLE 17

Example 16 was repeated but adding 33 ml. of N/10 hydrochloric acid in place of the 21 ml. of N hydrochloric acid. The pH of the filtrate was 7.6 and the extrudate was a very pale grey colour.

EXAMPLE 18

A pigment dispersion was made up by ball milling 778 gm. of a titanium dioxide pigment powder, 28 gm. of a carbon black, 135 gm. of an ultramarine blue pigment, 12 gm. of a 42% aqueous solution of sodium hydroxide, 87 gm. of stearic acid and 923 gm. of water.

A stirred stainless steel autoclave was charged with with the following ingredients:

| | |
|---|---|
| Distilled water _____ litres__ | 129 |
| Antifoaming agent (M437) _____ gm__ | 3 |
| Diisopropyl peroxidicarbonate _____ gm__ | 41 |
| Hydroxyethyl cellulose _____ gm__ | 58.6 |
| Wax E powder _____ gm__ | 373 |
| Lead stearate _____ gm__ | 271 |
| Dibasic lead stearate _____ gm__ | 271 |
| Paste of 6 parts of tribasic lead sulphate in 1 part of dioctyl phthalate _____ gm__ | 1450 |
| Calcium stearate _____ gm__ | 311 |

The autoclave was evacuated and purged as in Example 12 and 73.2 kg. of vinyl chloride was added. 826 gm. of the pigment dispersion was then washed in with 1 litre of water followed by 54 ml. of N hydrochloric acid washed in with 1 litre of water. The autoclave was heated to 57° C. Excess monomer was vented off when the pressure in the autoclave had dropped to 55 p.s.i. from the running pressure. The polymer was then filtered, washed and dried. The pH of the filtrate was 6.9.

The polymer was then extruded into tube using an 80 mm. twin screw Schloemann extruder with a die temperature of 180° C. The extrudate was a dark uniform grey with a good dispersion of pigment.

By way of comparison a repeat polymerisation was conducted using a pigment dispersion made by ball milling 778 gm. of the titanium dioxide pigment, 28 gm. of carbon black and 135 gm. of the ultramarine blue with 925 gm. of water. The extrudate had a poor dispersion of pigment and was a much paler grey.

EXAMPLE 19

100 gm. of a blue pigment, "Monastral" Fast Blue LBX, (C.1. Pigment Blue 15) was milled, using a gravel or sand mill, with a solution of 12 gm. of potassium stearate in 360 ml. of water giving a dispersion in which the average particle size of the pigment was 0.5 microns. ("Monastral" is a registered trademark.) 0.47 gm. of the resulting dispersion was charged to a stainless steel autoclave with the following ingredients and continuously agitated therein:

| | |
|---|---|
| Water _____ ml__ | 2666 |
| Partially hydrolysed polyvinyl acetate _____ gm__ | 2.6 |
| α,α′-azodiisobutyronitrile _____ gm__ | 6.5 |
| Tribasic lead sulphate powder _____ gm__ | 17 |
| Lead stearate _____ gm__ | 3.7 |
| Dibasic lead stearate _____ gm__ | 3.7 |
| Calcium stearate _____ gm__ | 5.3 |
| Wax E powder _____ gm__ | 6.4 |

The autoclave was evacuated and purged with nitrogen as in Example 12 to remove residual air. 1300 gm. of vinyl chloride was added followed by 25 ml. of N hydrochloric acid washed in with 50 ml. of distilled water. The temperature of the autoclave was raised to 57° C. and polymerisation allowed to proceed. When the pressure had fallen by 55 p.s.i. from the running pressure the autoclave was vented to atmospheric pressure. The polymer slurry was removed from the autoclave, filtered, washed and dried. The pH of the filtrate was 6.2. On extrusion the polymer gave a uniform blue extrudate.

The experiment was repeated omitting the potassium stearate from the pigment dispersion. The polymer gave a pale blue extrudate of non-uniform colour. This result was also obtained if the pigment was added to the autoclave as a dry powder instead of as an aqueous dispersion.

EXAMPLE 20

By way of comparison a polymerisation process was conducted using a dispersion of a calcium stearate coated pigment.

The coated pigment was made as follows:

100 gm. of a blue pigment, "Monastral" Fast Blue LBX (C.1. Pigment Blue 15) was milled using a gravel or sand mill with a solution of 12 gm. of potassium stearate in 360 ml. of water giving a dispersion in which the average particle size of the pigment was 0.5 microns. The resulting dispersion was treated with a solution of 2.1 gm. of calcium chloride in 19 ml. of water and the pigment coated with calcium stearate was filtered off, and washed free from water soluble electrolytes.

In order to obtain a stable dispersion of the coated pigment, it was necessary to mill the wet filtered pigment in ethylene dichloride using a Torrance high speed mixer. Th dispersion contained 1% of pigment (calculated as dry uncoated pigment).

The polymerisation procedure of Example 19 was repeated using 10 gm. of the dispersion of the coated pigment in ethylene dichloride in place of the dispersion of pigment in potassium stearate solution. On extrusion the polymer gave a uniform blue extrudate which was paler in colour than that using the dispersion of pigment in potassium stearate solution.

Further by way of comparison, the calcium stearate coated pigment in the form of a wet filter cake was shaken with ethylene dichloride and the resulting unstable dispersion added to the autoclave. The amount of pigment added was about 0.1 gm. (calculated as dry, uncoated pigment). The polymerisation was conducted as in the previous examples, the extrudate formed from the polymer was generally pale blue in colour but contained blue specks of undispersed agglomerated pigment. It is seen therefore that the use of a dispersion in potassium stearate enables the pigment to be readily and uniformly dispersed without the necessity of the extra milling steps required for calcium stearate coated pigments.

EXAMPLE 21

Example 1 was repeated using 108 gm. of an aqueous dispersion of tribasic lead sulphate in a potassium stearate solution in place of the titanium dioxide pigment paste.

50 ml. of N hydrochloric acid were washed into the autoclave with 50 ml. of distilled water after the vinyl chloride was charged.

The dispersion of tribasic lead sulphate was made by ball milling 200 gm. of tribasic lead sulphate powder with 500 ml. of a 10% aqueous potassium stearate solution.

The conversion from monomer to polymer was 73.5% and the retention of the tribasic lead sulphate was 81%. The pH of the aqueous medium filtered from the polymer was 5.5. The tribasic lead sulphate was very evenly dispersed through the polymer.

EXAMPLE 22

A stainless steel autoclave of capacity 6500 ml. was charged with 3360 ml. distilled water, a solution of 10 gm. hydroxyethyl cellulose in 250 ml. distilled water, 3.6 gm. lauryl peroxide, and 95.3 gm. of a dispersion of titanium dioxide in an aqueous solution of potassium stearate. The titanium dioxide dispersion was the same as that used in Example 2. 320 gm. vinyl acetate were added and the autoclave was continually stirred and purged twice with nitrogen at 50 p.s.i.g. 1680 gm. of vinyl chloride was then charged to the autoclave. Then 200 ml. N/10 hydrochloric acid was washed in with 50 ml. distilled water and the autoclave was heated to 74° C. When the pressure had dropped to 50 p.s.i.g. excess monomer was vented from the autoclave and the resulting polymer slurry filtered and washed and dried. The conversion of the monomers to polymer was 76% and 94% of the titanium dioxide was retained by the polymer. The pH of the aqueous medium filtered from the polymer was 4.0. The dispersion of titanium dioxide in the polymer was even.

We claim:

1. A process for the manufacture of polymeric compositions consisting of polymerizing monomeric material consisting of at least one ethylenically unsaturated monomer selected from the group consisting of vinyl halides, vinylidene halides, vinyl esters of carboxylic acids, chloroprene, esters of $\alpha,\beta$-ethylenically unsaturated acids with saturated alcohols, styrene and butadiene in an aqueous medium in a polymerization vessel in the presence of a free radical yielding polymerization catalyst and adding from 0.001 to 10% by weight, based on the weight of the monomeric material, of a solid additive dispersed in an aqueous solution containing from 0.2 to 40% by weight, based on the weight of the additive, of a water soluble salt of a fatty acid containing at least 6 carbon atoms to the aqueous medium before polymerization of the monomeric material is complete and, after adding the additive dispersion, reducing the pH of the aqueous medium to less than 7.0 before the polymeric material is separated from the aqueous medium and while unreacted monomeric material is present in the polymerization vessel.

2. A process as claimed in claim 1 wherein the dispersion of the additive is added to the aqueous medium before polymerisation commences.

3. A process as claimed in claim 2 wherein the dispersion of the additive is added to the aqueous medium in the polymerisation vessel before the monomeric material is charged thereto and the pH of the aqueous medium is reduced to less than 7.0 after the addition of the monomeric material.

4. A process as claimed in claim 1 in which the dispersion of the additive is a dispersion of at least one pigment.

5. A process as claimed in claim 1 in which the water soluble salt is a salt a fatty acid containing 6 to 22 carbon atoms.

6. A process as claimed in claim 5 in which the water soluble salt is a salt of a fatty acid containing 8 to 20 carbon atoms.

7. A process as claimed in claim 6 in which the water soluble salt is a salt of a fatty acid containing 12 to 18 carbon atoms.

8. A process as claimed in claim 7 in which the water soluble salt is selected from the group consisting of potassium or sodium stearate.

9. A process as claimed in claim 1 in which there is from 1.0 to 30% by weight, based on the weight of the additive, of the water soluble salt in the additive dispersion.

10. A process as claimed in claim 9 in which there is from 15 to 25% by weight based on the weight of the additive, of the water soluble salt in the additive dispersion.

11. A process as claimed in claim 1 in which the dispersion of the additive contains from 10 to 60% by weight of the additive.

12. A process as claimed in claim 1 in which the polymerisation is conducted by the aqueous suspension technique.

13. A process as claimed in claim 1 in which the monomeric material is selected from the group consisting of vinyl chloride and a mixture of vinyl chloride with up to 20% by weight of the mixture of at least one comonomer selected from the group consisting of vinyl acetate, vinylidene chloride, alkyl acrylates and alkylmethacrylates.

References Cited

UNITED STATES PATENTS

| 2,067,234 | 1/1937 | Gordon et al. | 260—23 |
| 3,215,663 | 11/1965 | Weisberg | 260—41 |
| 3,220,965 | 11/1965 | Ambler | 260—22 |
| 3,242,121 | 3/1966 | Hill | 260—29.6 |
| 3,296,001 | 1/1967 | Ambler et al. | 106—30 |

DONALD E. CZAJA, Primary Examiner

R. A. WHITE, Assistant Examiner

U.S. Cl. X.R.

260—23, 29.6, 29.7, 41, 45.75, 89.3, 89.5, 92.3, 92.8, 93.5, 94.2